Nov. 9, 1943.                J. V. WILSON                2,334,153
                             ELECTRIC MOTOR
                         Filed March 16, 1942           3 Sheets-Sheet 1
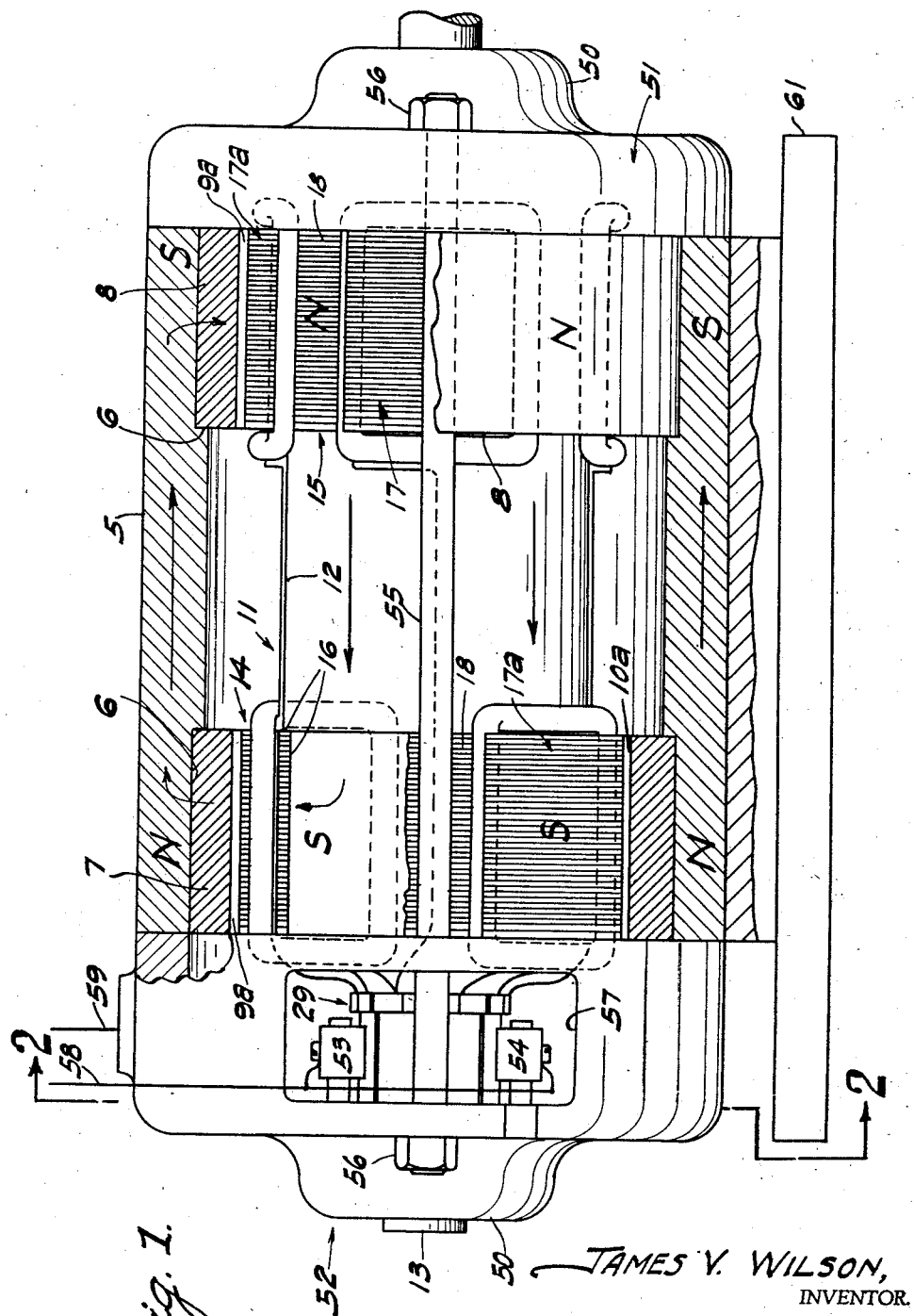
JAMES V. WILSON,
INVENTOR.
BY 
ATTORNEY.

Nov. 9, 1943.

J. V. WILSON 2,334,153

ELECTRIC MOTOR

Filed March 16, 1942

JAMES V. WILSON,
INVENTOR.

BY
ATTORNEY.

Nov. 9, 1943.  J. V. WILSON  2,334,153
ELECTRIC MOTOR
Filed March 16, 1942  3 Sheets-Sheet 3
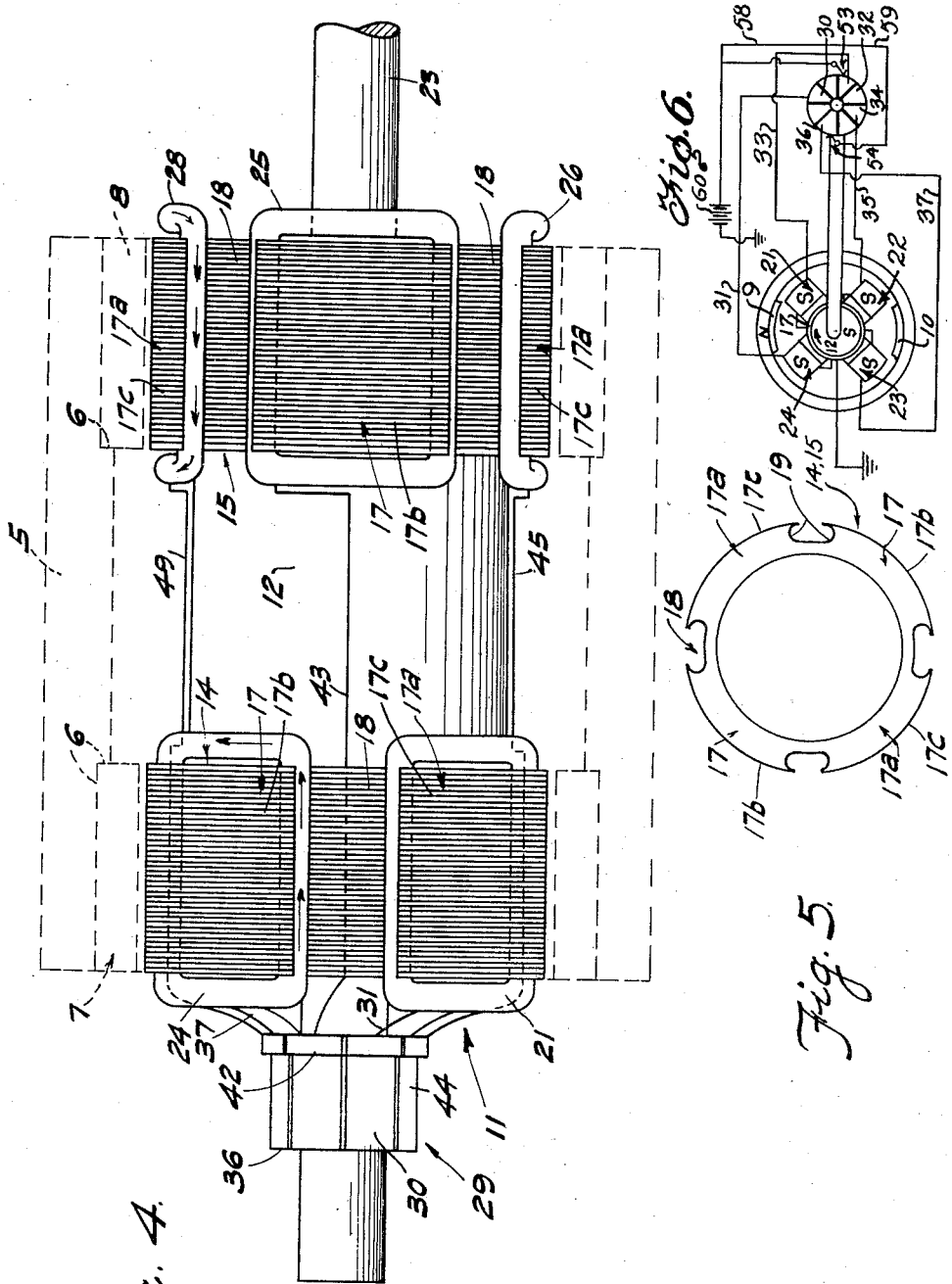
JAMES V. WILSON,
INVENTOR.

Patented Nov. 9, 1943

2,334,153

UNITED STATES PATENT OFFICE 2,334,153

ELECTRIC MOTOR

James V. Wilson, Los Angeles, Calif., assignor to Chessie J. Wilson, Los Angeles, Calif.

Application March 16, 1942, Serial No. 434,925

8 Claims. (Cl. 172—36)

My invention relates to improvements in electric motors.

More particularly the invention relates to improvements in electric motors embodying a plurality of permanent magnets, such magnets being preferably constructed of the metallic composition known to the trade as "alnico."

A further object of the invention is to provide an improved motor combination of permanent and electro-magnets.

A still further object of the invention is to provide an improved electric motor of fractional horse power rating which is better adapted for use in refrigerator plants, or in rural districts where battery power is used, also for use in air conditioning systems employing motor driven fans and blowers.

Still another important object of the invention is to provide an improved motor which is more simple and cheaper to construct, easier to manufacture, since little if any machining is necessary in resurfacing the cast "alnico" magnets; and requiring less expense in their upkeep and maintenance, as the parts are more easily accessible in making repairs, only individual short-circuited coils requiring replacement.

With the foregoing and other objects in view, the invention resides in the novel arrangement and combination of parts and in the details of construction hereinafter described and claimed, it being understood that changes in the precise embodiment of the invention herein disclosed may be made within the scope of that which is claimed without departing from the spirit of the invention.

Referring to the accompanying drawings, which illustrate what, at present, is deemed to be a preferred embodiment of the invention, Fig. 1 is a view of the complete motor showing it partly sectioned vertically and partly in side elevation. Parts are also broken away to show underlying structure.

Fig. 2 is a vertical section on angular line 2—2 of Fig. 1, except that a fragment of the base is shown in elevation. A portion of the wiring is diagrammatically shown in this view.

Fig. 3 is an elevation looking at the left end of Fig. 4.

Fig. 4 is a side elevation of the rotor structure, stationary parts being indicated by broken lines.

Fig. 5 is a face view of the laminated rings on a reduced scale.

Fig. 6 is a schematic diagram of rotor connections.

Referring in detail to the drawings, the motor includes a stationary permanent magnet 5 of a hollow cylindrical shape having a north pole at one end and a south pole at the other end, and at each end being provided with an internal, annular recess 6 within one of which is mounted a soft iron ring 7, a like soft iron ring 8 being mounted in the opposite of said recesses.

The rings 7 and 8 are each provided with a pair of pole pieces 9 and 10, see Fig. 2, the pole pieces of each ring being arranged in diametrically opposed relation. Said rings are cast within said magnet 5, or are welded thereto. These rings tend to better concentrate the magnet lines of force and bridge the air gap between the stationary magnet 5 and the rotating permanent magnet presently to be described.

The cylindrical body 5 consists of a powerful "alnico" magnet, the new nickel-aluminum-cobalt-iron permanent magnet alloy. Extensive laboratory tests indicate that "alnico" has a high permanency factor, higher than other magnetic materials, and possess a marked advantage in reducing magnets in size and weight. The high coercive force of these magnets causes them to be practically immune to the effects of magnetic disturbances. They are unaffected by A. C. fields which would demagnetize previous types, even chromium steel magnets. These magnetic properties are further augmented by ease of fabrication, as proper design allows the magnets to be cast economically to final dimensions.

The composition of the alloy comprising the type of permanent magnets used may be seen by referring to Patent #1,968,569; dated July 31, 1934.

The rotary armature 11 comprises preferably, a cylindrical bar magnet 12 which is also preferably constructed of "alnico", mounted on the armature shaft 13, and a pair of laminated soft iron rings 14 and 15, one mounted on each end of said bar magnet; angular, annular recesses 16 (one of which is shown at the commutator end in Fig. 1) being provided to receive these rings. These rings are each formed to provide a plurality of pairs of exterior pole pieces 17 and 17a which are each separated by undercut recesses 18.

The pole pieces 9 and 10 have pole faces 9a and 10a (see Fig. 1) and the pole pieces 17 and 17a have pole faces 17b and 17c (see Fig. 5) which are arranged to cooperate with said pole faces 9a and 10a. The pole faces 17b and 17c have the same axial length as said pole faces 9a and 10a.

The concave undercuts 19 at the ends of said recesses 18 and pole pieces 17 and 17a of ring 14, receive windings 21, 22, 23 and 24. The concave undercuts at the ends of recesses 18 and pole pieces 17 and 17a of ring 15 receive windings 25, 26, 27 and 28. The undercuts 19 aid in keeping said windings in place, and the windings are circumferentially spaced around the rings 14 and 15 and embrace as individual loops the pole pieces around which they extend to aid in forming a magnetic excitation system. These windings (all former wound coils) are located equidistant from the axis of the armature shaft 13 and are somewhat arcuate, with their arcuate faces directed toward said shaft.

As to the segments of the commutator 29, winding 21 is connected to commutator segment 30 by wire 31; winding 22 is connected to commutator segment 32 by wire 33; winding 23 is connected to commutator segment 34 by wire 35; and winding 24 is connected to commutator segment 36 by wire 37. Windings 21, 22, 23 and 24 are respectively grounded to the ring 14 by wires 38, 39, 40 and 41. Said wires 31, 33, 35 and 37 connect circumferentially extending windings 21, 22, 23 and 24 in consecutive order to alternating segments 30, 32, 34 and 36 of the commutator.

Winding 25 is connected to commutator segment 42 by wire 43; winding 26 is connected to commutator segment 44 by wire 45; winding 27 is connected to commutator segment 46 by wire 47; and winding 28 is connected to commutator segment 48 by wire 49. Windings 25, 26, 27 and 28 are grounded to ring 15 in the same manner in which windings 21, 22, 23 and 24 are grounded to ring 14. But, as viewed in Fig. 4, the windings of ring 15 are wound in a clockwise direction and those of ring 14 are wound in an anticlockwise direction.

Wires 43, 45, 47 and 49 connect circumferentially extending windings 25, 26, 27 and 28 in consecutive order to intervening segments 42, 44, 46 and 48 of the commutator. The connections from one set of coils to the commutator segments and thru the brushes to the power supply are shown more clearly in Fig. 6. By these connections the winding on each polar projection on the rotor is connected to the direct current power supply as it passes the center line of the polar projection on the stator. The current is in the direction to tend to reverse the polarity of the projection thereby reducing the attractive force between the particular projection and the stator to practically zero. It may even reverse the polarity of the projection in which case there would be a repulsion between the projections at this point which would assist in turning the rotor. The bucking effect of the rotor projection also causes a modification of the flux distribution across the face of the opposing stator polar projections. Due to the bucking field set up by the current in coil 21, the magnetic flux in the stator projection is shifted toward the approaching polar projection as explained later in the specification.

The pole pieces of the armature rings 14 and 15 are equally spaced. The pole pieces of ring 14, as shown in Fig. 4, are arranged around the bar magnet 12 in alternate relation to those of the other ring 15. It will be seen from Fig. 2 that alternate windings of each laminated ring are connected by the wires to alternating commutator segments.

The armature shaft 13 is supported by bearings 50 located in the end caps 51 and 52, the latter cap or bell being of sufficient size to enclose the commutator 29 together with its two brushes 53 and 54, supported by said cap 52 as shown in Fig. 1. Said two caps are constructed of non-magnetic material and are clamped against opposite ends of the intervening structure by a plurality of rods 55 furnished with nuts 56. The cap 52 has a plurality of lateral openings 57 through its wall, one of which is shown in Fig. 1, and is doweled in the well known manner in its relation to the magnet 5, to prevent circumferential displacement. Leads 58 and 59 electrically connect the motor with the battery 60 which supplies operating current. The cylindrical magnet 5 is fixedly mounted upon the base 61, which is preferably constructed of non-magnetic material.

Although a great advantage results from constructing the motor of "alnico" the invention, as hereinafter defined by the claims, is not limited to making the magnets of said material.

In the operation of the device the magnetic lines of force travel from the north pole to the south pole in the cylindrical magnet 5 and return in the opposite direction through the armature bar magnet 12, as indicated by the arrows in Fig. 1, supplying the entire tractive force of the armature and field magnets. After the armature magnets have been attracted to the field magnets, a means must be provided to release the armature magnets from their magnetic attraction to the field poles and repel them in order to provide for the rotation of the armature.

As has been explained in reference to Figs. 2 and 6, the inner and outer (rotor and stator) magnets of the machine are equipped with radial projections at their ends, and the inner or rotor projections are equipped with coils which are energized in selected order. With reference to Fig. 6, with the north and south polar projections in the position shown, coil 21 is energized with a current flowing down the right hand side and up the left. The ampere turns of this coil buck the ampere turns equivalent of the permanent magnets and if sufficiently great, neutralize the latter or even cause the flux in the air gap of pole of coil 21 to reverse. The number of magnetic lines thus prevented from entering pole of coil 21 will be forced to pass across the gap of pole of coil 26. Similar conditions exist with regard to poles of coils 23 and 22 respectively and in identical manner. Thus poles of coils 24 and 22 are strengthened by the bucking effects of coils 21 and 23. With little or no flux in the air gaps of poles of coils 21 and 23 or a value contrary to that of the main permanent field little or no force (or perhaps repulsion) is to be expected from these poles while, due to reinforcement, poles of coils 22 and 24 are attracted by the main north pole faces of the stator, causing tendency to rotate.

At the same time the poles of coils 26 and 28 at the other end of the machine are in mid position with respect to their adjacent stator poles. It is evident that each stator pole is wider than a rotor pole; hence, a small angle of motion of the rotor is possible in either direction before any appreciable locking action begins. By the time locking is about to occur coils 26 and 28 are energized due to new segments of the commutator contacting the brushes and a process similar to the one just described for coils 21 and 23 takes place in coils 26 and 28. A sequence of overlapping torques is thus secured and rotation is capable of being started in any position of the rotor.

What is claimed is:

1. In an electric motor, a cylindrical shell consisting of a permanent magnet composed of "alnico" and having a north pole at one end and a south pole at the opposite end, a soft iron ring within each end portion of said shell and having its periphery surrounded by said shell, each of said rings having a pair of pole pieces, the pole pieces of each ring being in a diametrically opposed relation.

2. The combination with a cylindrical field magnet frame having recesses extending inwardly from each end thereof and soft iron rings provided with diametrically opposed pole pieces mounted in said recesses; of an armature, said armature comprising a cylindrical bar magnet, a shaft whereon said bar magnet is mounted to rotate in an internal concentric relation to said field magnet frame and rings, a laminated soft iron ring mounted on each end portion of said bar magnet in a surrounding relation thereto, each of said rings having at least one pair of externally projecting pole pieces, said pair of pole pieces being mounted at an angle to each other whereby they are out of alignment with the pole pieces on said magnetic frame.

3. In an electric motor, a stator member and a rotor member, each of said members comprising a hollow cylindrical permanent magnet having soft iron polar projections on the north pole end and on the south pole end, and a magnet coil on each of said projections on one of said members, means whereby said magnet coils may be connected to a source of direct current as the respective projection passes each one of the projections on the other of said members to modify the flux distribution across the face of the projection on said other member.

4. In an electric motor, a stator comprising a hollow cylindrical permanet magnet and a soft iron ring having a plurality of radial polar projections, mounted within each end of said stator permanent magnet, a rotor comprising a cylindrical permanent magnet, and a soft iron ring having a plurality of external radial polar projections, mounted on the periphery of each end of said rotor permanent magnet and a magnet coil on each of said external radial projections on said rotor, a commutator on said rotor whereby the magnet coil on each of said projections may be connected to a source of direct current as said rotor projection passes the center line of each one of said stator projections to thereby modify the flux distribution across the face of the stator projections.

5. In an electric motor, in combination, a stator comprising a hollow cylindrical shell of magnetic material provided with a plurality of members of soft magnetic material supporting diametrically opposed pole projections, a rotor comprising a cylindrical permanent magnet having a plurality of soft iron projections on the north pole end and on the south pole end and a magnet coil on each of said projections on said rotor, a commutator mounted on said rotor whereby the magnet coil on each of said rotor projections may be connected to a source of direct current as said rotor projection passes the center line of each one of said stator projections to thereby modify the flux distribution across the face of the stator projections.

6. In an electric motor, a stator comprising a hollow cylindrical permanent magnet having a plurality of soft iron projections on the north pole end and on the south pole end, a rotor comprising a cylindrical permanent magnet having a plurality of soft iron projections on the north pole end and on the south pole end and a magnet coil on each of said projections on said rotor, a commutator mounted on said rotor whereby the magnet coil on each of said rotor projections may be connected to a source of direct current as said rotor projection passes the center line of each one of said stator projections to thereby modify the flux distribution across the face of the stator projections.

7. In an electric motor, a stator comprising a hollow cylindrical permanent magnet having N-soft iron projections on the north pole end and on the south pole end, a rotor comprising a cylindrical permanent magnet having N-pair of soft iron projections on the north pole end and on the south pole end and a magnet coil on each of said projections on said rotor, a commutator mounted on said rotor whereby the two magnet coils of each pair of projections on said rotor may be connected successively to a source of D. C. power to modify the magnetic flux distribution across the face of the projections on said stator.

8. In an electric motor, the combination of a cylindrical permanent magnet stator having a plurality of soft iron polar projections on the north pole end and on the south pole end, a cylindrical permanent magnet rotor having a plurality of pairs of soft iron projections on the north pole end and on the south pole end, each one of said pairs of projections on said rotor being provided with a magnet coil, and a commutator whereby the magnet coils on each of rotor projections may be connected successively to a source of D. C. power to thereby modify the flux distribution across the face of the stator projections.

JAMES V. WILSON.